United States Patent [19]

Eberlein

[11] Patent Number: 5,482,640
[45] Date of Patent: Jan. 9, 1996

[54] AQUEOUS DISPERSIONS STABILIZED FROM FREEZE/THAW CYCLES

[75] Inventor: Thomas H. Eberlein, Schuylkill Haven, Pa.

[73] Assignee: Consep, Inc., Bend, Oreg.

[21] Appl. No.: 331,477

[22] PCT Filed: Apr. 30, 1992

[86] PCT No.: PCT/US92/03630

§ 371 Date: Oct. 28, 1995

§ 102(e) Date: Oct. 28, 1995

[87] PCT Pub. No.: WO93/22394

PCT Pub. Date: Nov. 11, 1993

[51] Int. Cl.$^6$ .............................. C09K 5/00; C08L 27/18
[52] U.S. Cl. .............................. 252/70; 106/13; 106/447; 106/448; 252/73; 523/334; 524/186; 524/210; 524/394; 524/546

[58] Field of Search .............................. 106/13, 447, 448; 252/70, 73; 524/546, 81, 155, 186, 210, 211, 233, 394; 523/334

[56] References Cited

U.S. PATENT DOCUMENTS

| | | | |
|---|---|---|---|
| 3,968,069 | 7/1976 | Grimaud et al. | 524/236 |
| 4,053,443 | 10/1977 | Reick | 523/220 |
| 4,704,422 | 11/1987 | Bakken | 524/375 |

FOREIGN PATENT DOCUMENTS 043985  1/1982  European Pat. Off. .

*Primary Examiner*—Anthony Green
*Attorney, Agent, or Firm*—Chernoff, Vilhauer, McClung & Stenzel

[57] ABSTRACT

Aqueous dispersions of PTFE and $TiO_2$ stabilized from the effects of freeze/thaw cycles are disclosed, wherein the stabilizing agents are monohydric alcohols and monoamines having less than five carbon atoms.

11 Claims, No Drawings

AQUEOUS DISPERSIONS STABILIZED FROM FREEZE/THAW CYCLES

BACKGROUND OF THE INVENTION

1. Field of the Invention

This invention relates to aqueous dispersions of finely divided solids and, more particularly, to aqueous dispersions of finely divided solids that are stabilized against the destructive effects of freeze/thaw cycles.

2. Discussion of the Prior Art

It is well recognized that aqueous dispersions of finely divided solids are somewhat fragile in the sense that care must be taken to maintain a stable dispersion in which the particles, depending upon their density, neither settle to the bottom nor float to the top of the aqueous medium. Most generally, a surfactant is used to aid in establishing a stable aqueous dispersion and it is selected to have affinity for the dispersed particles at one end of its structure and to be hydrophilic at the other end of its structure. This provides for a basic compatibility between the dispersed particles and the water which, in a sense, can loosely be visualized as "hydrating" the dispersed particles.

A particularly troublesome problem arises when an aqueous dispersion is shipped or stored during the winter months and the dispersion is exposed to subfreezing temperatures. Generally it may be expected that when an otherwise stable dispersion is exposed to one or more freeze/thaw cycles, the dispersion will be "broken". This means that after the frozen dispersion is thawed, the particles will separate, often irreversibly, from the aqueous medium. As will be discussed in more detail below, it is believed that the reason the dispersion becomes unstable upon freezing is that the freezing process withdraws the "water of hydration" from the dispersed particles causing them to lose their mutual repulsion and coalesce.

The state of the art methods used to prevent the destruction of a stable dispersion from freeze/thaw cycles are quite simple. First, it is obvious that the dispersions may be shipped and stored in heated environments to prevent the ambient temperature from falling below the freezing temperature of the aqueous dispersion. Second, "anti-freeze" agents, such as alcohols and glycols, may be added to the aqueous dispersion in sufficient amounts to depress the freezing point to a temperature below that at which the aqueous dispersion will be exposed. Both of these methods have their drawbacks. For example, maintaining a suitable ambient temperature during shipping and storing requires special handling; it is somewhat expensive; and it is subject to human error, as when a container of an aqueous dispersion is accidentally left standing on a loading dock in cold weather.

Anti-freeze agents that depress the freezing point of the aqueous dispersion have several disadvantages in that they add an expense; some of them may impart toxicity to the aqueous dispersion; and, of particular concern depending upon the nature of the aqueous dispersion with which they are used, the anti-freeze agents when added in sufficient quantities to significantly depress the freezing point, may adversely effect the stability of the aqueous dispersion. In the latter instance, the useful properties of the dispersion and its commercial utility may be lost.

Occasional references to other methods for stabilizing an aqueous dispersion from the effects of freeze/thaw cycles can be found in the literature. For example, U.S. Pat. No. 4,053,443 discloses that a pipe joint sealing compound comprised of an aqueous dispersion of fluorocarbon particles can be freeze/thaw stabilized by the addition of a combination of sodium hydroxide and monoethanolamine. U.S. Pat. No. 3,879,302 claims the use of freeze/thaw stabilizing compounds selected from the group comprising silanes and silizanes (sic) to stabilize aqueous dispersions of polytetrafluoroethylene sealing compositions.

SUMMARY OF THE INVENTION

Accordingly, it is an object of this invention to stabilize aqueous dispersions from the destructive effects of freeze/thaw cycles.

Another object of this invention is to provide a method for protecting aqueous dispersions from the effects of freeze/thaw cycles which does not require transporting and storing the aqueous dispersions in heated spaces. Another object of this invention is to provide a method for protecting aqueous dispersions from the effects of freeze/thaw cycles that is not subject to failure, as by human error.

Another object of this invention is to provide a method for protecting aqueous dispersions from the effects of freeze/thaw cycles that can utilize comparatively inexpensive and nontoxic stabilizing agents.

Another object of this invention is to provide a method for protecting aqueous dispersions from the effects of freeze/thaw cycles that can utilize stabilizing agents in such small amounts that they will not adversely effect the stability of the aqueous dispersion.

Another object of this invention is to provide a method for protecting aqueous dispersions from the effects of freeze/thaw cycles that uses smaller amounts of stabilizing agents than is be required to depress the freezing point significantly.

Briefly, these and other objects of this invention are achieved by selecting a stabilizing agent for inclusion in an aqueous dispersion which will be effective, upon freezing, to cause the development of anomalies in the ice crystals. These anomalies are believed to be geometrically incompatible with the crystalline structure of ice and, as a result, a fully ordered crystal structure is unable to form within the ice.

It has been observed that the stabilizing agents which are effective in the practice of this invention must be polar compounds capable of hydrogen bonding with water and, it is believed, capable of forming clathrates with water. Especially useful are the monohydric alcohols having less than five carbon atoms and the amine analogs of the alcohols. When these stabilizing agents have more than two carbon atoms, the use of their isomers is preferred to make a shorter and more compact molecule better suited to the formation of a clathrate hydrate.

MECHANISM OF THE INVENTION

It is recognized that it unnecessary to disclose the theoretical basis of an invention to support a patent but, in this instance, it is thought that an explanation of the mechanism, as best it is understood, will be helpful to a clearer understanding of the invention and the intended scope of the appended claims. While the mechanism as here proposed is based, perhaps, only on informed speculation, it has proven quite consistent with all of the observed data.

1. The Structure of Water and Ice.

A molecule of water contains two atoms of hydrogen covalently bonded to an atom of oxygen. The three atoms do not lie along a straight line as the two hydrogen atoms are bent toward each other. Opposite to the hydrogen atoms are two electronic clouds of negative electrification. As a result, part of the water molecule is negatively charged and part is positively charged, resulting in a highly polar molecule.

Hydrogen atoms in water molecules are attracted to regions of high electron density and can form weak linkages, which are referred to as hydrogen bonds. For this reason, the hydrogen atoms of one molecule of water are attracted to the electron cloud of an adjacent water molecule and the water molecules exhibit a strong association for each other. As the temperature of water is reduced and the freezing point is approached, this association becomes highly ordered and, at freezing, a crystal lattice is formed that is made up of the water molecules joined to one another by the hydrogen bonds. It has been suggested that the oxygen atoms in the ice crystal are situated in "puckered" or "dimpled" layers, and the atoms within each layer are, in turn, arranged in a hexagonal fashion. Thus in ice the collective strength of an essentially infinite network of hydrogen bonds holds the molecules of water in a very specific geometry, dictated by the disposition of the hydrogen atoms, that is two covalently bound and two hydrogen bonded around each oxygen atom. Substitution of a non-hydrogen bonding impurity molecule and the introduction of a defect in the crystal does not usually happen because of the energetic unfavorability (loss of strong hydrogen bonding interactions) if it were to happen.

When water that contains other materials such as dissolved solids, liquids, or gases freezes, the solid ice phase that forms is essentially pure water. Since the chemical similarity between most dispersed particles and water is not very great, there is very little tendency for an ice crystal to incorporate a dispersed particle "accidentally" at a lattice site that "should have" been occupied by a water molecule.

The hydrogen bonding interactions and the highly ordered crystal formation which occurs when water freezes excludes dissolved solids and gases and dispersed solids from the forming ice crystals. Viewed from another aspect, the freezing can be considered a "dehydration" process in which the water is removed from the dissolved or dispersed foreign substances as the water-to-ice conversion progresses.

Applying the above to the freeze/thaw stabilization of aqueous dispersions, it is generally believed that particles that are held in dispersion by surfactants are made stable by "water of hydration", which is to suggest that the water molecules interact with the polar ends of the surfactant molecules and enshroud the otherwise water insoluble particle. Upon freezing, the "water of hydration" is withdrawn causing the dispersed particles to contact each other and coalesce. It follows that when the water is melted, the coalesced particles may precipitate from the dispersion in an irreversible manner.

The discovery upon which this invention is based is that the stabilizers here disclosed are effective to inhibit the freezing induced coagulation process by preventing, or at least strongly inhibiting, the "dehydration" of the dispersed particles. This results from the fact that the stabilizers interfere with the formation of highly ordered ice crystals and provide protective spaces surrounding the particles to prevent their "dehydration" and subsequent coalescing.

2. The Stabilizing Agents.

The stabilizing agents of this invention are agents are monofunctional polar compounds which form a clathrate with water ice crystals (here sometimes refereed to as clathrate hydrates). As is known, a clathrate compound is an inclusion complex in which molecules of one substance are completely enclosed within a cage like structure of molecules of another substance. In the case of ice, a clathrate hydrate can be formed in which the ice crystal is comprised of perhaps 20 or more water molecules arranged in an approximately spherical structure surrounding a clathrating molecule. The clathrate hydrate is itself a polar compound that can hydrogen bond to the hydrophilic end of a surfactant or, alternatively, to other clathrate hydrates. In the former instance, the dispersed particles are protected from "dehydration". In the latter instance the clathrate hydrate molecules can bond to themselves, to ordinary ice crystals or to the hydrophilic end of the surfactant, any of which will result in a highly disordered crystalline structure that will provide protective spaces encapsulating the dispersed particles.

The clathrating agent must, of course, be a molecule small enough to fit within the clathrate hydrate, it must have a polar end group capable of hydrogen bonding with water and it should have greater affinity for water than it has for the particles to be dispersed. These requirements essentially limit the selection of clathrate hydrate formers to monohydric alcohols and amines that have less than five carbon atoms. In the case of the alcohols, the methyl alcohol molecule is slightly smaller than ideal, the ethyl alcohol molecule approaches the ideal size and butyl and propyl alcohol are slightly too large and therefore, if they are used to form the clathrate hydrate, it is preferred that their isomeric forms be used to reduce the length of the carbon chain in any one direction. The same generalities apply to the amine analogs of the alcohols.

It is of special interest that the clathrating agents need not be used in large amounts for its only necessary to provide relatively few clathrate hydrate molecules to accomplish the desired disruption of ordinary ice crystals. As the clathrate hydrate formed around ethyl alcohol, for example, is thought to contain about 20 water molecules, the addition of only a 0.05 molar quantity of the clathrating agent will provide for the theoretical alignment of essentially all of the water molecules into clathrate hydrates. In point of fact, it has been found that only about 5% of theoretical maximum clathrating agent need be used, or about a 0.0025 molar quantity will suffice. Quantities of clathrating agents this small will not depress the freezing point of a aqueous dispersion to any material degree. By comparison, forty times this amount, that is a 0.1 molar quantity of ethyl alcohol, is required to depress the freezing point of the aqueous dispersion by ten degrees Celsius.

Experimental data supports the conclusion that the alcohols and amines here discussed due indeed induce the formation of a clathrate hydrate in which the alcohol and amine molecules are enclosed or caged. Since these clathrating agents fill the free volume of the clathrate hydrate, the volume occupied by the water and the clathrating agent is less than the total volume of the water and the clathrating agents before they are mixed together. As a result, the end point at which the water will not form additional clathrate hydrates can be determined by observing when the volume of the aqueous dispersion begins to increase in direct proportion to the amount of the clathrating agent added to the aqueous dispersion.

In addition to cost saving, it is sometimes functionally important that low levels of a clathrating agent be used. For example, in the case of an aqueous dispersion of finely divided polytetrafluoroethylene particles in a size range of from about 0.2 to 0.5 microns, the addition of sufficient quantities of ethyl alcohol to cause a meaningful reduction in the freezing point of the aqueous dispersion will result in the destruction of the dispersion and the precipitation of the polytetrafluoroethylene particles.

EXAMPLES

Tabularized below, grouped in decreasing order of effectiveness as stabilizing agents to protect against freeze/thaw cycles, are various compounds which have been tested. The minimum effective weight percentages listed are approximations.

The aqueous dispersions used in these examples were comprised of 30% by weight of polytetrafluoroethylene and were prepared from a commercially available dispersion of polytetrafluoroethylene particles of about 0.5 micron or smaller particle sizes as dispersed in water and an non-ionic surfactant (Sold under the trade designation Teflon (R) B from E. I. Du Pont de Nemours and Company.)

The data was obtained by freezing the dispersions at a temperature of −20 degrees Celsius and, after holding them at this temperature overnight, letting the samples thaw at room temperature. The thawed samples were evaluated for their effectiveness.

In addition to the data tabulated, some tests were made using finely divided solids other than polytetrafluoroethylene, including titanium dioxide and other pigments, and it was found that the stabilizing agents of this invention had a beneficial effect upon the stability of these dispersions after exposure to freeze/thaw cycles.

| Minimum Effective Stabilizing Agent | Weight Percentage | Rank |
| --- | --- | --- |
| Ethyl alcohol | 0.6 | 1 |
| Methyl alcohol | 0.8 | 2 |
| Isopropyl alcohol | 0.8 | |
| Diethylamine | 1.0 | 3 |
| Dimethyl sulfoxide | 1.0 | |
| Formaldehyde | 1.2 | |
| Acetone | 1.6 | 4 |
| 1,4-butanediol | 1.8 | |
| Diethylene glycol | 1.5 | |
| Dimethoxyethane | 1.3 | |
| Dimethylformamide | 1.4 | |
| 2-(2-ethoxyethyl)ethanol | 1.3 | |
| Ethylene glycol | 1.8 | |
| Glycerol | 1.4 | |
| 1,6-hexanediamine | 1.8 | |
| N-methylpyrrolinone | 1.9 | |

-continued

| Minimum Effective Stabilizing Agent | Weight Percentage | Rank |
| --- | --- | --- |
| Acetic acid | 1.8 | 5 |
| t-Butyl alcohol | 1.5 | |
| Glucose | 2.0 | |
| Phosphoric acid | 1.9 | |
| Sucrose | 2.2 | |
| Urea | 1.6 | |
| Acetonitrile | | 6 |
| 2-Butanone | | |
| Formic acid | | |
| s-Butyl alcohol | | |

I claim:

1. A method of stabilizing an aqueous dispersion of particles having an average size of less than one micron, said particles being selected from titanium dioxide and polytetraflouroethylene, against the harmful effects of freeze/thaw cycles comprising adding a stabilizing agent to said dispersion wherein said stabilizing agent consists essentially of an organic, monofunctional, polar compound having less than five carbon atoms selected from a monohydric alcohol and a monoamine, and wherein said stabilizing agent is present in an amount not exceeding 0.05 molar based upon the water present in said aqueous dispersion.

2. The method of claim 1 wherein said stabilizing agent forms a clathrate hydrate with water.

3. The method of claim 1 wherein said stabilizing agent is used in an amount between about 0.0025 and 0.05 molar based upon the water present in said aqueous dispersion.

4. The method of claim 2 wherein said stabilizing agent is ethyl alcohol.

5. The method of claim 1 wherein said stabilizing agent is an isomeric form of propyl or butyl alcohols.

6. An aqueous dispersion of particles having an average size of less than one micron, said particles being selected from titanium dioxide and polytetraflouroethylene, that is stabilized against the adverse effects of freeze/thaw cycles by the presence of a stabilizing agent consisting essentially of a monofunctional polar compound having less than five carbon atoms selected from a monohydric alcohol and a monoamine, said stabilizing agent being present in an amount less than 0.05 molar based upon the water present in said aqueous dispersion.

7. The dispersion of claim 6 wherein said stabilizing agent forms a clathrate hydrate with water.

8. The dispersion of claim 6 wherein said particles have an average size of less than about 0.5 micron.

9. The dispersion of claim 6 including a surfactant.

10. The dispersion of claim 6 wherein said stabilizing agent is ethyl alcohol.

11. The dispersion of claim 10 including a surfactant.

* * * * *

UNITED STATES PATENT AND TRADEMARK OFFICE
CERTIFICATE OF CORRECTION

PATENT NO. : 5,482,640

DATED : January 9, 1996

INVENTOR(S) : Thomas H. Eberlein

It is certified that error appears in the above-indentified patent and that said Letters Patent is hereby corrected as shown below:

Col. 2, line 31: delete "is" and substitute -- would otherwise -- therefor

Col. 2, line 52: after "it" insert -- is --

Col. 4, line 1: insert -- that -- after "agents" (second occurrence)

Col. 4, line 3: delete "refereed" and insert -- referred --

Col. 4, line 59: after discussed delete "due" and insert -- do --

Signed and Sealed this

Second Day of April, 1996

Attest:

BRUCE LEHMAN

Attesting Officer       Commissioner of Patents and Trademarks